United States Patent
Joerger et al.

(10) Patent No.: US 8,822,907 B2
(45) Date of Patent: Sep. 2, 2014

(54) OPTICAL POSITION-MEASURING DEVICE HAVING TWO CROSSED SCALES

(75) Inventors: Ralph Joerger, Traunstein (DE);
Michael Hermann, Tacherting (DE);
Wolfgang Holzapfel, Obing (DE);
Walter Huber, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 184 days.

(21) Appl. No.: 13/288,007

(22) Filed: Nov. 2, 2011

(65) Prior Publication Data

US 2012/0112050 A1 May 10, 2012

Related U.S. Application Data

(60) Provisional application No. 61/410,702, filed on Nov. 5, 2010.

(30) Foreign Application Priority Data

Nov. 5, 2010 (DE) .................... 10 2010 043 469

(51) Int. Cl.
*G01D 5/34* (2006.01)
*G01B 11/24* (2006.01)
*G01D 5/38* (2006.01)

(52) U.S. Cl.
CPC .............. *G01D 5/38* (2013.01); *G01B 11/2441* (2013.01)
USPC ......... 250/231.1; 250/221; 250/235; 250/216

(58) Field of Classification Search
USPC ......... 250/231.1, 221, 559.4, 559.34, 559.38, 250/559.3, 231.13; 356/616, 622, 399–401; 359/436, 439, 440; 341/13; 33/1 M, 1 L; 369/44.29, 44.32, 44.35, 44.37
See application file for complete search history.

(56) References Cited

U.S. PATENT DOCUMENTS

| | | | |
|---|---|---|---|
| 5,171,999 A * | 12/1992 | Komatsu et al. | 250/548 |
| 5,648,658 A * | 7/1997 | Holzapfel et al. | 250/237 G |
| 6,351,313 B1 | 2/2002 | Braasch et al. | |
| 7,573,581 B2 * | 8/2009 | Holzapfel | 356/499 |
| 7,723,671 B2 * | 5/2010 | Makinouchi et al. | 250/231.13 |
| 7,796,272 B2 | 9/2010 | Holzapfel | |

(Continued)

FOREIGN PATENT DOCUMENTS

| | | |
|---|---|---|
| EP | 1 019 669 | 7/2000 |
| EP | 1 762 828 | 3/2007 |
| WO | WO 2008/138501 | 11/2008 |

*Primary Examiner* — Georgia Y Epps
*Assistant Examiner* — Carolynn A Moore
(74) *Attorney, Agent, or Firm* — Kenyon & Kenyon LLP

(57) ABSTRACT

An optical position-measuring device includes a scanning bar extending in a first or second direction, and a scale extending in the other direction. The scale is offset by a scanning distance from the scanning bar in a third direction perpendicular to the first and second directions. The device has a light source whose light penetrates the scanning bar at an intersection point of the scanning bar and scale to fall on the scale and arrive back at the scanning bar. At a detector, the light is split by diffraction into different partial beams at optically effective structures of the scanning bar and scale and combined again. A periodic signal is obtained in the detector in response to: a shift between the scanning bar and scale in the first direction due to interference of combined partial beams, and a change in the scanning distance between the scanning bar and scale.

14 Claims, 12 Drawing Sheets

(56) References Cited

U.S. PATENT DOCUMENTS

| | | |
|---|---|---|
| 7,907,286 B2 | 3/2011 | Holzapfel |
| 2007/0013920 A1* | 1/2007 | Holzapfel .................... 356/616 |
| 2008/0067333 A1* | 3/2008 | Holzapfel et al. ............ 250/234 |
| 2008/0285050 A1* | 11/2008 | Hermann ...................... 356/499 |
| 2008/0285058 A1* | 11/2008 | Holzapfel ..................... 356/616 |
| 2009/0195792 A1* | 8/2009 | Hermann et al. ............. 356/622 |

* cited by examiner

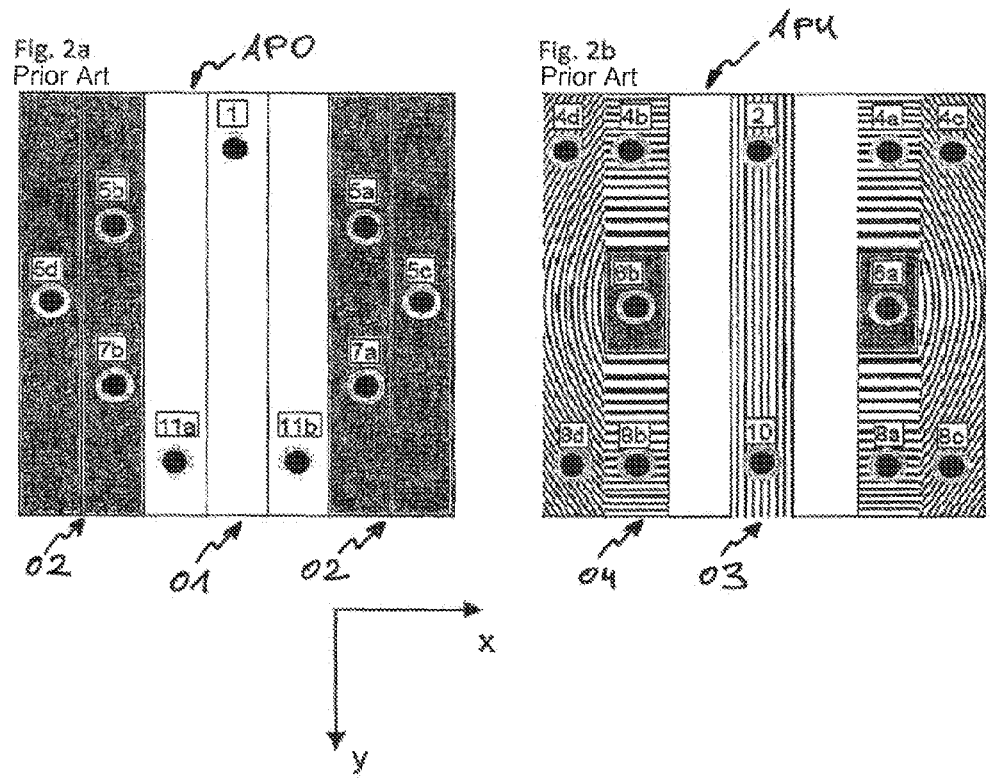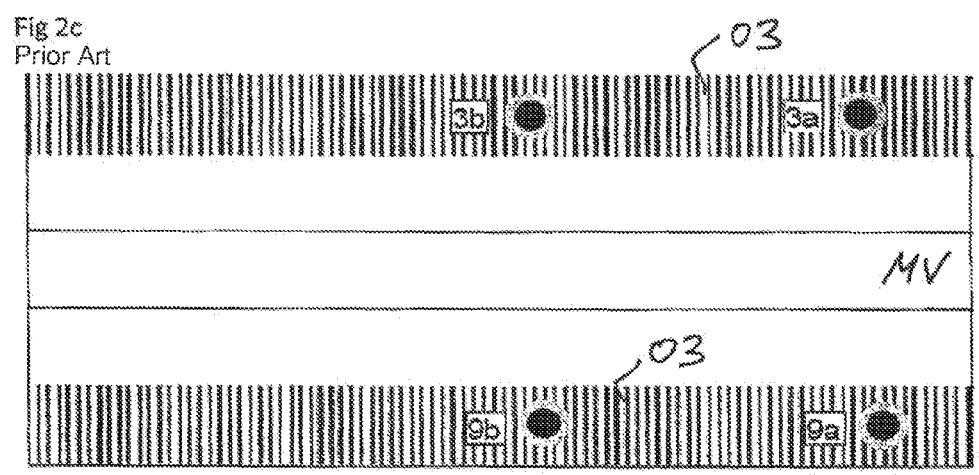

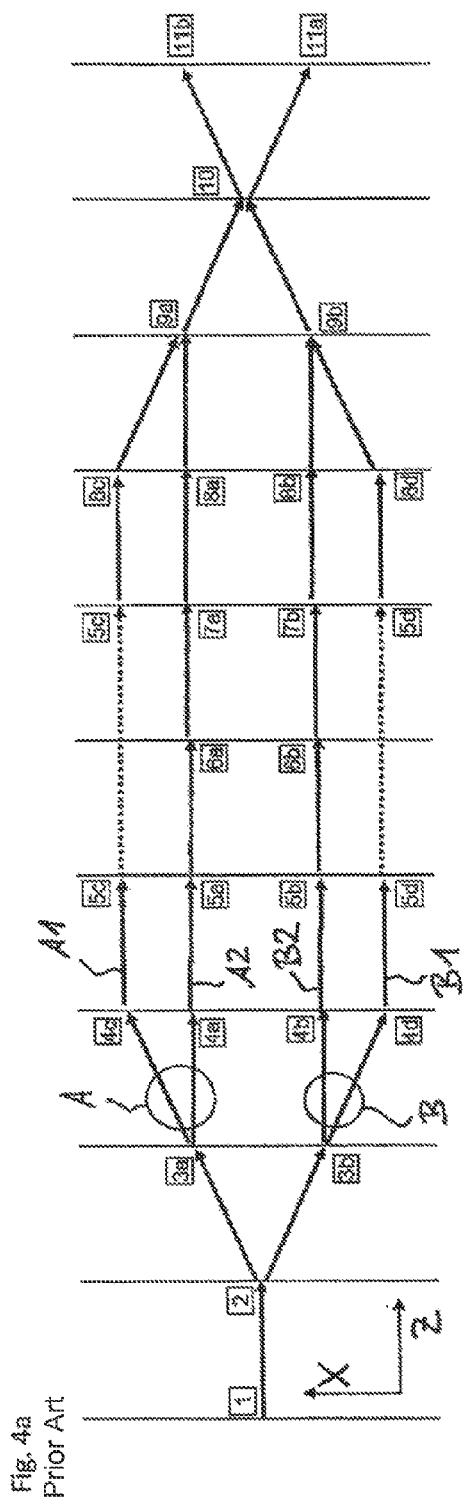
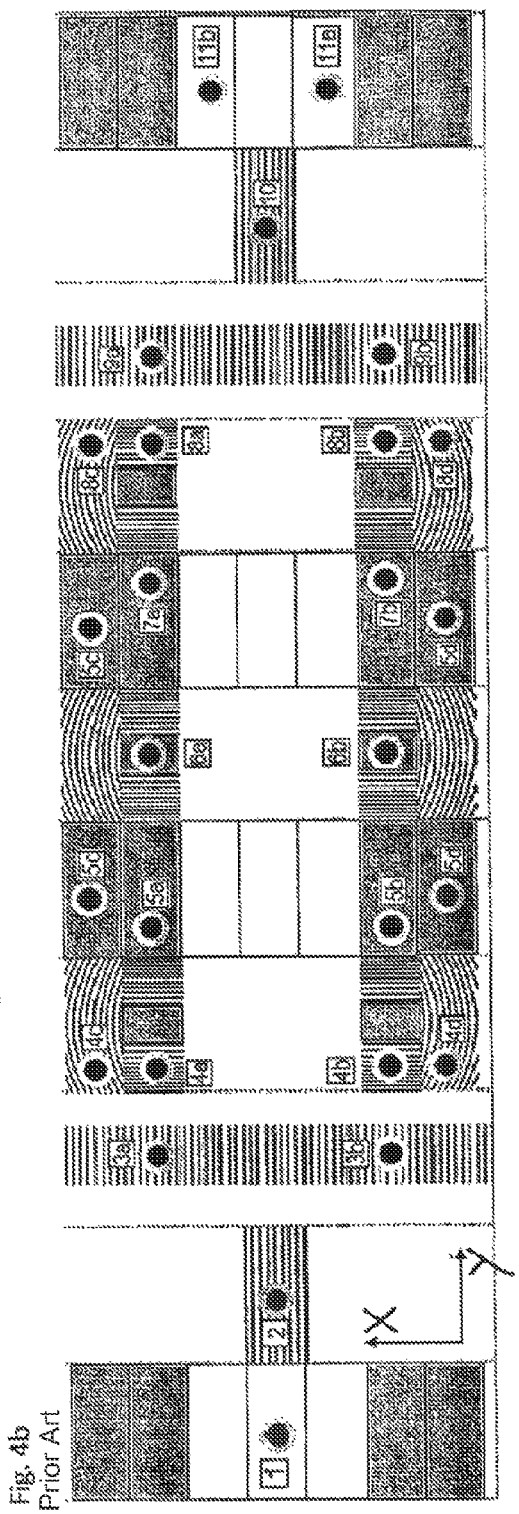
Fig. 4a Prior Art
Fig. 4b Prior Art

Fig. 5a
Fig. 5b
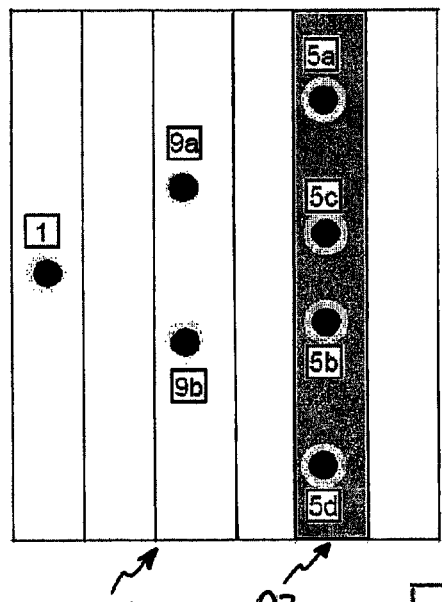
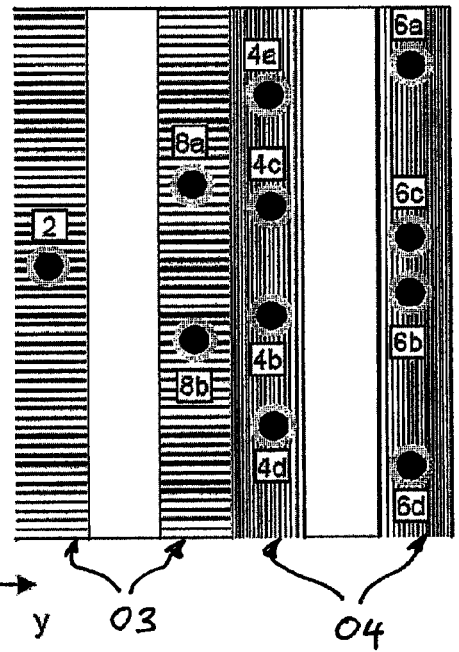
Fig 5c
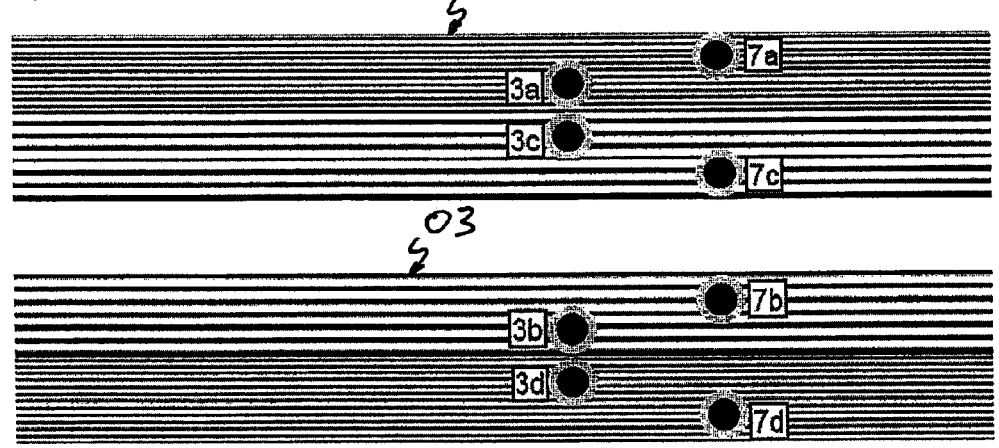

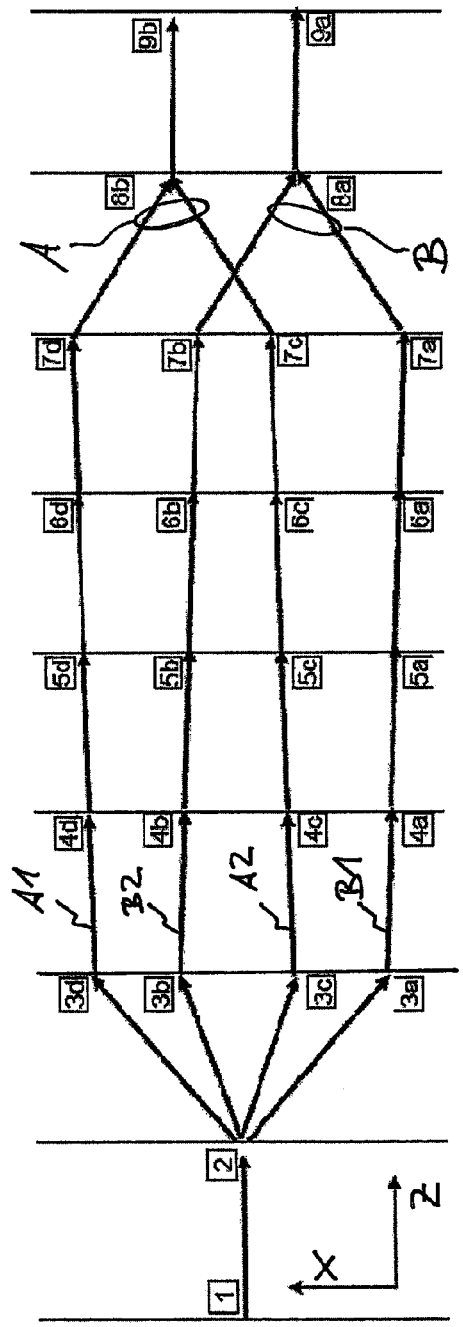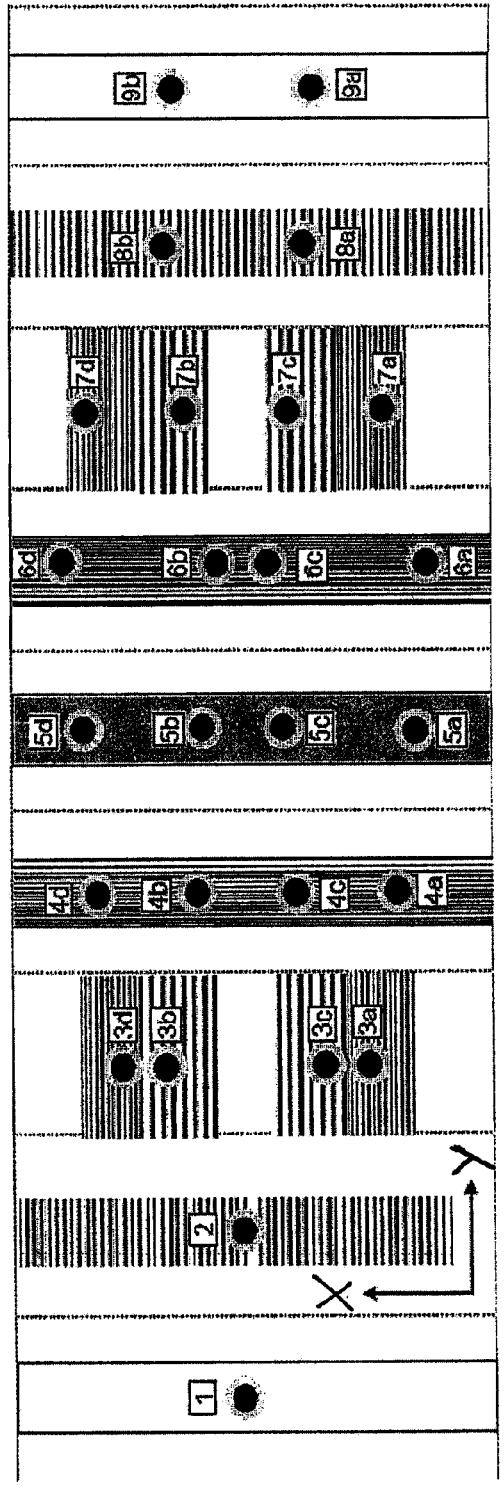
Fig. 7a
Fig. 7b

Fig. 8a
Fig. 8b
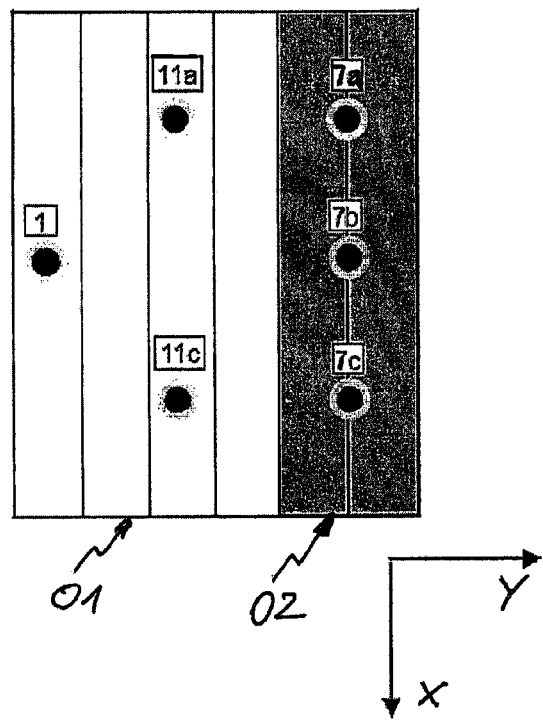
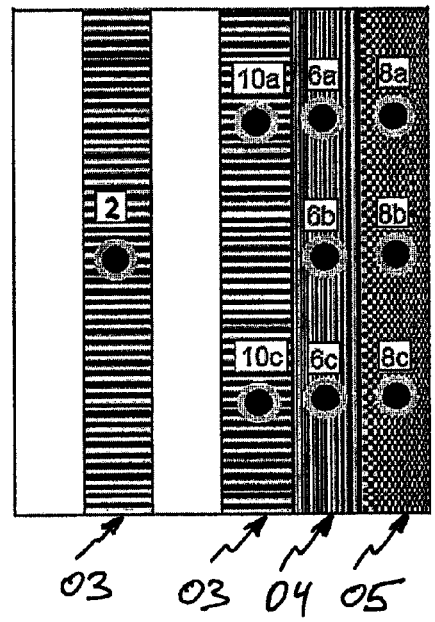
Fig 8c
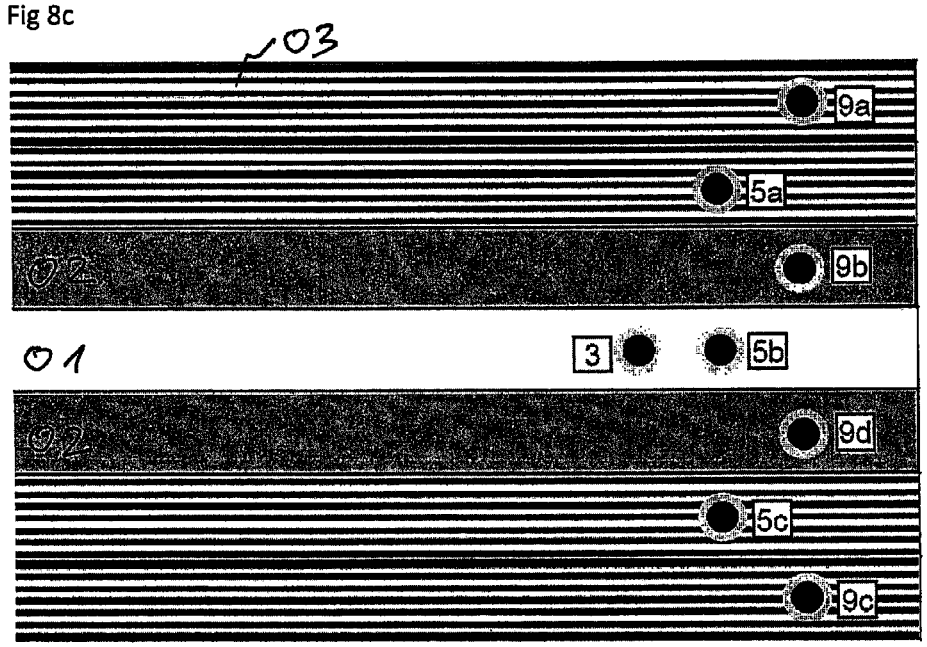

OPTICAL POSITION-MEASURING DEVICE HAVING TWO CROSSED SCALES

CROSS-REFERENCE TO RELATED APPLICATIONS

The present application claims priority to Application No. 10 2010 043 469.8, filed in the Federal Republic of Germany on Nov. 5, 2010, and claims the benefit of U.S. Provisional Patent Application No. 61/410,702, filed on Nov. 5, 2010, each of which is expressly incorporated herein in its entirety by reference thereto.

FIELD OF THE INVENTION

The present invention relates to an optical position-measuring device, e.g., for ascertaining the position of two objects movable relative to each other.

For example, the present invention relates to position-measuring devices that uses measuring standards having optical diffraction gratings which split incident light into different partial beams by diffraction. By combining suitable partial beams, periodic signals are obtained in a photodetector in response to a shift of the one measuring standard relative to the other, due to the interference of the two partial beams. The extent of the shift may be inferred by counting the periods in the detector.

BACKGROUND INFORMATION

Interferential position-measuring devices are used for extremely accurate position measurements, for instance, in the semiconductor industry where, for example, exposure masks for the photolithography must be moved relative to a wafer with speeds of more than one meter per second. In doing so, a positioning accuracy in the nanometer range and, in the future, even lower, must be maintained. A great advantage of such systems compared to conventional interferometers is that the interfering partial beams must only travel very short distances, and therefore are minimally affected by environmental influences such as fluctuations in air pressure, temperature and humidity which could falsify the measurement because of a fluctuating refractive index of the air.

PCT International Published Patent Application No. WO 2008/138501 describes working with two crossed scales which bear optical diffraction gratings having lines that are transverse to the common measuring direction. Using such a measuring system, it is possible to ascertain the position of a table, movable in two directions, in the measuring direction, regardless of the position of the table in the other of the two directions. If one uses two such measuring systems, which are disposed at an angle of 90 degrees relative to each other, it is possible to ascertain the position of the table in the second direction, as well, this time regardless of the position of the table in the first direction.

The system described in PCT International Published Patent Application No. WO 2008/138501 has the disadvantage that movements of the table in a direction perpendicular to the table plane cannot be ascertained.

In order to ascertain the position of a table in the table plane, measuring systems having crossed gratings are scanned at several locations, and are thus able to ascertain lateral shifts and a rotation in the table plane. In addition, European Patent No. 1 019 669 describes use of additional distance sensors by which movements perpendicular to the table plane, and therefore all six degrees of freedom of the table, may then be ascertained, as well. However, such distance sensors, such as tangent or capacitive measuring styluses, do not satisfy the stringent accuracy requirements of present-day and future manufacturing facilities in the semiconductor industry. In addition, highly accurate, extended, crossed gratings can only be produced with extremely high expenditure.

European Published Patent Application No. 1 762 828 describes an optical position-measuring device which, in addition to a measurement in the actual measuring direction (horizontal measuring direction), allows a measurement of the scanning distance perpendicular to the measuring direction, thus, the distance between the scale and its scanning unit. This is synonymous with the measurement of a second degree of freedom perpendicular to the measuring direction (vertical measuring direction). In this case, a light beam passes through a transparent scanning plate having various optical structures, onto a reflective measuring standard on the scale. The light, split into two bundles of partial beams, travels back and forth several times between the scanning plate and the scale. In this context, the partial beams of a bundle of partial beams travel asymmetrically with respect to a plane perpendicular to the horizontal measuring direction and have different path lengths. The bundles of partial beams interact with widely varying, optically effective structures disposed on the upper and lower sides of the scanning plate and on the upper and lower sides of the measuring standard, such as with gratings for splitting or combining light beams of different orders of diffraction, mirrors for reflecting and lenses for selective deviating of light.

Ultimately, partial beams that interfere with one another are combined with each other, and thus periodic signals are generated in several photodetectors in response to a relative movement between the measuring standard and the scanning head. Due to the asymmetrical configuration of the partial beams, periodic signals are obtained in the detectors, from which it is possible to determine both the horizontal and the vertical shift of the measuring standard and scanning head, and therefore the lateral and vertical shift of the two objects movable relative to each other.

However, because of the structure of the scanning plate of the system described in European Published Patent Application No. 1 762 828, it cannot be used for a measuring system having crossed scales, as was described above. The scanning plate cannot be extended to form a second scale, relative to which the first scale could move transversely to the measuring direction, without interfering with the measurement.

SUMMARY

Example embodiments of the present invention provide an optical position-measuring device, having two crossed scales, such that an additional measurement of the scanning distance between the two scales is made possible.

According to example embodiments of the present invention, an optical position-measuring device includes a scanning bar and a scale. The scanning bar extends in a first or a second of two directions, and the scale extends in the other of the two directions. The scale is disposed so as to be offset by a scanning distance with respect to the scanning bar in a third direction perpendicular to the first and second directions. The optical position-measuring device further includes a light source whose light penetrates the scanning bar at a point of intersection of the scanning bar and scale in order to fall on the scale, and from there, to arrive back at the scanning bar, and further, at a detector, the light being split by diffraction into different partial beams at optically effective structures of the scanning bar and scale and being combined again, a periodic signal being obtained in the detector in response to a shift between the scanning bar and scale in the first direction, due to interference of partial beams combined with each other. In this context, the optical position-measuring device is configured such that periodic signals are obtained in the detector in response to a change in the scanning distance between the scanning bar and the scale.

This result is achieved because individual partial beams form groups, the partial beams of a first group and the partial beams of a second group having a phase difference between each other as a function of the scanning distance.

To that end, the partial beams of the first group and the partial beams of the second group, respectively, may have an asymmetrical course between each other with respect to a plane perpendicular to the first direction.

The optical structures on the scanning bar may be periodic or translation-invariant with respect to the first direction, so that the scanning bar is able to be extended over the entire travel path in the first direction.

The optical structures on the scale may be periodic or translation-invariant with respect to the second direction, so that the scale is able to be extended over the entire travel path in the second direction.

In order to obtain detector signals of sufficient quality, in addition, the optical structures should not have more than two periodicities locally.

According to an example embodiment of the present invention, an optical position-measuring device includes: a scanning bar extending in one of (a) a first and (b) a second of two directions; a scale extending in an other one of (a) the first and (b) the second directions; a light source; and a detector. The scale is offset by a scanning distance with respect to the scanning bar in a third direction perpendicular to the first and second directions. The light is arranged such that light from the light source penetrates the scanning bar at a point of intersection of the scanning bar and the scale in order to fall on the scale, and from there, to arrive back at the scanning bar, and further, at a detector, the light being split by diffraction into different partial beams at optical structures of the scanning bar and the scale, and combined again. The detector is adapted to generate periodic detector signals in response to a shift between the scanning bar and the scale in the first direction, due to interference of the partial beams combined with each other, and the detector is adapted to generate periodic detector signals in response to a change in the scanning distance between the scanning bar and the scale.

The detector signals may remain unchanged in the event of a shift between the scanning bar and the scale in the second direction.

The partial beams may form groups, and the partial beams of a first group and the partial beams of a second group may have a phase difference between each other as a function of the scanning distance.

The phase difference may be reduced to zero for a predefined scanning distance.

One partial beam within each group may travel an additional distance within a transparent substrate of one of (a) the scale and (b) the scanning bar.

The partial beams of the first group may travel in mirror symmetry relative to the partial beams of the second group with respect to a plane perpendicular to the first direction.

The partial beams of the first group and the partial beams of the second group may have an asymmetrical course between each other with respect to a plane perpendicular to the first direction.

The partial beams may undergo a retroreflection.

The partial beams may travel in parallel prior to and after the retroreflection.

The retroreflection may be effected with the aid of at least one diffractive lens and a reflecting surface.

The detector may be adapted to generate detector signals, in each case phase-shifted relative to each other, from the interfering partial beams of each group, and a shift between the scanning bar and the scale in the first direction and a change in the scanning distance may be ascertainable based on different combination of the detector signals of the first group and of the second group.

The optical structures on the scanning bar may be least one of (a) periodic and (b) translation-invariant with respect to the first direction.

The optical structures on the scale may be at least one of (a) periodic and (b) translation-invariant with respect to the second direction.

The optical structures on at least one of (a) the scanning bar and (b) the scale may have a maximum of two local periodicities.

Further features and aspects of example embodiments of the present invention are described in more detail with reference to the appended Figures.

BRIEF DESCRIPTION OF THE DRAWINGS

FIGS. 1a to 4b illustrate a conventional optical position-measuring device.

FIGS. 5a to 7b illustrate an optical position-measuring device according to an example embodiment of the present invention.

FIGS. 8a to 10b illustrate an optical position-measuring device according to an example embodiment of the present invention.

DETAILED DESCRIPTION

Figure 1A:
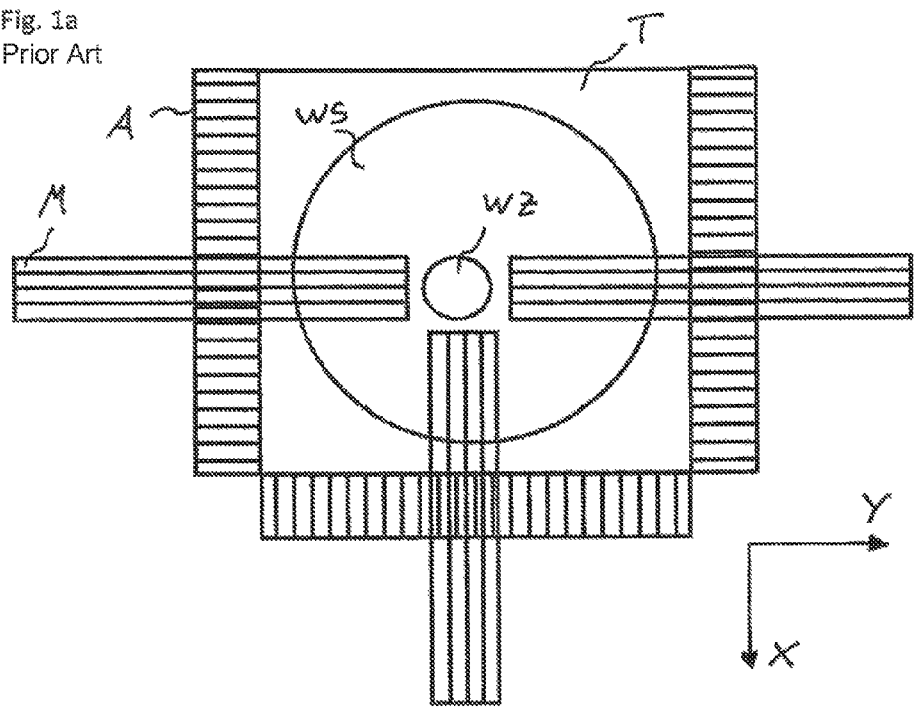

FIG. 1a shows a top view of a table T whose position is to be ascertained in a plane defined by first direction X and second direction Y. To that end, optical position-measuring devices are disposed on table T, which in each case have a scanning bar A disposed at a table edge and extending in a measuring direction, and a scale M extending transversely to the measuring direction. Both scanning bar A and scale M bear evenly-spaced grating structures whose grating lines are arranged transversely to the respective measuring direction.

Located on the table is a workpiece WS that is to be processed by a tool WZ. For example, workpiece WS may be a wafer and tool WZ may be exposure optics, relative to which, the wafer is to be positioned. Tool WZ may also be the imaging optics of a microscope, with which the wafer is to be examined.

In order to be able to ascertain the position of table T both in first direction X and in second direction Y, and in addition, to also be able to determine a rotational twist of the table about a Z-axis perpendicular to first and second directions X, Y, three of these optical position-measuring devices are arranged on table T. Hereinafter, only the position-measuring device arranged at the left table edge in FIG. 1a is discussed.

Figure 1B:
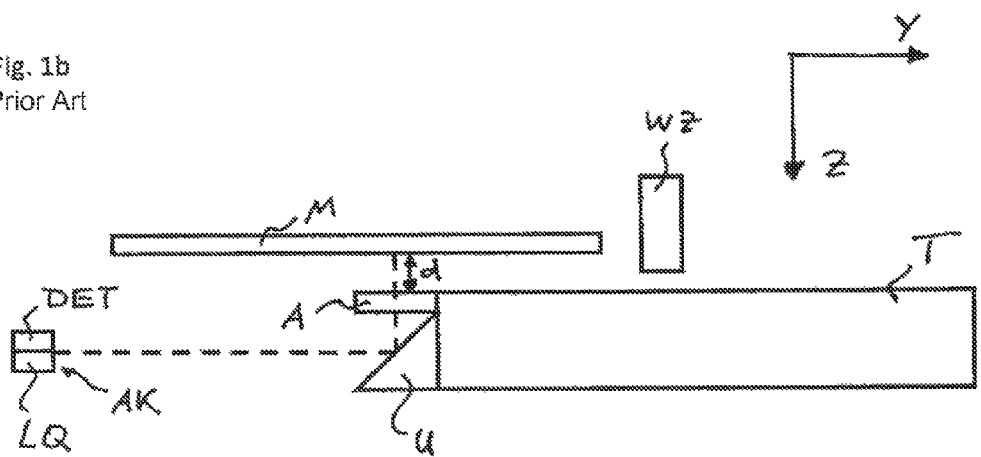

FIG. 1b shows a side view of device illustrated in FIG. 1a. First direction X, which is the measuring direction for the position-measuring device, is perpendicular to the drawing plane.

Located in a scanning head AK is a light source LQ, whose light falls initially on a reflecting mirror U arranged in parallel to scanning bar A at the table edge. From there, the light passes through transparent scanning bar A onto reflective scale M, and continuing on a return path offset and parallel to the forward path, back into scanning head AK, in which a plurality of detectors DET convert the incoming light into electrical signals. These signals are periodic in response to a shift of table T in measuring direction X. The number of periods, which may be increased by interpolation, is a measure for the shift of table T. In addition, direction information may be obtained by generating a plurality of signals phase-shifted relative to each other (e.g., 0/90 degree or 0/120/240 degree phase shift).

In this example, scanning head AK, scale M and tool WZ are stationary, while table T, together with reflecting mirror U, scanning bar A and workpiece WS, are movable jointly in the table plane. This conventional arrangement has the advantage that it is possible to measure the position of the table in first direction X independently of the position of the table in second direction Y. Since the grating lines, decisive for the position measurement, on scanning bar A and on scale M are located transversely with respect to measuring direction X, the detector signals of the detectors in scanning head AK remain unchanged in response to a movement of table T in second direction Y, and react only to a movement in actual measuring direction X.

The distance between scanning bar A and scale M is referred to as scanning distance d. If the table additionally moves in third direction Z, for example, due to guiding errors, scanning distance d therefore automatically changes as well, since scanning bar A is firmly joined to table T, and scale M is stationary relative to the table. Thus, a further degree of freedom of the table would be able to be determined by ascertaining scanning distance d.

However, conventional position-measuring devices, which are based on crossed measuring standards as shown in FIGS. 1a and 1b, cannot measure scanning distance d. On the contrary, they are usually configured such that to the greatest extent possible, a small change in the scanning distance has no effect on the actual position measurement.

FIGS. 2a to 4b show a conventional optical position-measuring device in which the distance between the scanning plate of a scanning head and a scale may be ascertained additionally and in a direction perpendicular to the actual position measurement in the scale direction.

Figure 3A:
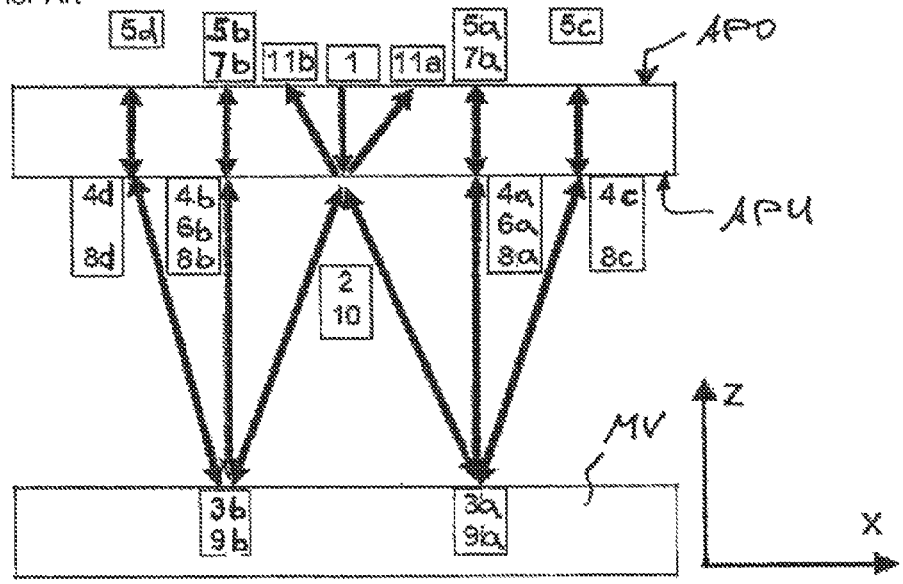
Figure 3B:
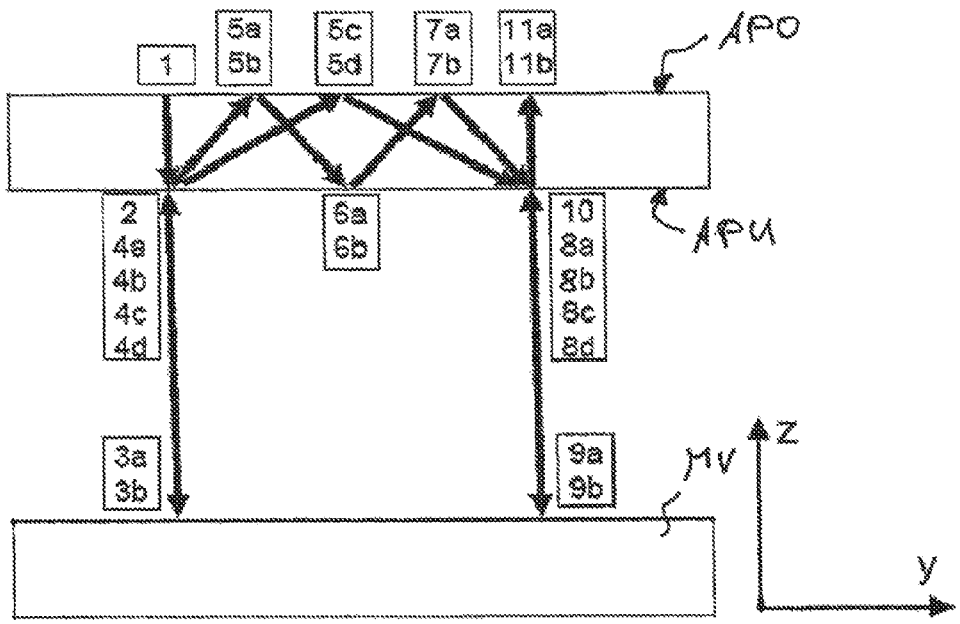

FIGS. 2a, 2b and 2c are plan views of the upper side and lower side of a transparent scanning plate, together with the respective passage points of light beams of the optical position-measuring device. FIGS. 3a and 3b are cross-sectional views which spatially illustrate the beam path. FIG. 4a shows an unfolded beam path in which, for reasons of clarity, reflections are also represented as transmission through an optical boundary surface. In FIG. 4b, in which the correct positioning with respect to FIG. 4a is arranged, these boundary surfaces and their structuring are depicted again.

In all representations, the passage points or impact points of the light through the boundary surfaces are marked and numbered consecutively. With each interaction at a boundary surface, the number of a point is increased by one. If several partial beams are formed by diffraction, they are designated at the following impact points by a, b, c, etc.

FIG. 2a shows a scanning-plate upper side APO, through which light from a light source passes at point 1. At this location, the scanning plate is transparent and preferably anti-reflection-coated in order to avoid retroreflections. Optical structure O1 at the location of the light entry at point 1 is thus an unpatterned area of the transparent glass substrate of the scanning plate. FIG. 2b shows scanning-plate lower side APU which is facing a measuring standard MV. The light coming from point 1 strikes an evenly-spaced grating O3 at point 2 and is split into two partial beams which leave the scanning plate and strike measuring standard MV at points 3a and 3b.

At points 3a and 3b, the light also strikes an evenly-spaced grating O3 whose lines, as already noted at point 2, are arranged transversely with respect to measuring direction X. Both partial beams are once more split into two partial beams, and are reflected back to scanning-plate lower side APU, where they strike at points 4a, 4b, 4c, 4d.

In order to compensate for certain influences with respect to tilting between the scale and the scanning plate, at this juncture, the four partial beams must be directed in parallel, and at the same time, be focused on specular structures O2 on the upper side of the scanning plate. To that end, at points 4a and 4b, scanning-plate lower side APU has optical structures O4 in the form of a one-dimensional grating having variable grating periods. These structures act as a cylindrical lens and focus the incident light. In addition, at points 4c and 4d, the grating lines are curved to achieve, in addition to the lens effect, a parallel direction of the respective light beams.

At points 5a, 5b, 5c and 5d, the four partial beams strike specular surfaces on scanning-plate upper side APO.

From points 5a and 5b, there is a further reflection to specular surfaces O2 on scanning-plate lower side APU, where the light strikes at points 6a and 6b. From there, the light travels again to scanning-plate upper side APO and strikes specular surfaces O2 at points 7a and 7b.

From specular surfaces O2 at points 5c, 5d, 7a and 7b, the light beams travel again to scanning-plate lower side APU where at points 8a and 8b, they strike one-dimensional gratings O4 having variable grating periods that act as cylindrical lenses, and at points 8c and 8d on structures which, in addition to the lens effect, change the direction of the beams with the aid of curved grating lines. At points 9a and 9b on the upper side of measuring standard MV, two light beams each are brought to interference, at least two phase-shifted beams thereby being produced. From points 9a and 9b of measuring standard MV, the light beams thus produced travel to scanning-plate lower side APU, where at point 10, they strike evenly-spaced grating O3 and are deviated into an appropriate direction. At points 11a and 11b, two light beams then leave the scanning plate at upper side APO and arrive finally at detectors, in which signals, phase-shifted relative to each other, are generated.

Particularly in FIG. 4a, it can be seen that partial beams A1, B1 which travel from point 3a to 4c and from 3b to 4d, respectively, must traverse a longer distance in the scanning gap between measuring standard MV and scanning-plate lower side APU than the two partial beams A2, B2 which travel from point 3a to 4a and from point 3b to 4b, respectively. Due to this asymmetry within the two bundles of partial beams A, B with respect to a plane perpendicular to measuring direction X, a phase difference results in the interfering partial beams which is a function of scanning distance d. Therefore, a change in scanning distance d produces periodic signals in the detectors in the same manner as a shift of measuring standard MV in measuring direction X relative to the scanning plate.

However, since the two bundles of partial beams A and B extend symmetrically relative to each other with respect to the specified plane perpendicular to measuring direction X, by summing up the position information gained from the two bundles of partial beams, it is possible to determine the pure shift in the X-direction, and the change in scanning distance d may be determined from a difference between the two sets of position information.

A detailed derivation of the physical basics and the functioning method of the measurement of scanning distance d in principle, based on the mentioned asymmetry of the bundles of partial beams discussed, with respect to a plane that is perpendicular to the lateral measuring direction is found in paragraphs through of European Published Patent Application No. 1 762 828, as mentioned above, which is expressly incorporated herein in its entirety by reference thereto. The exemplary embodiment of FIG. 3 of European Published Patent Application No. 1 762 828 is represented in FIGS. 2a to 4b hereof.

However, on the basis of FIGS. 2a and 2b, it can also be discerned that such a position-measuring device is not readily suitable to be used in a system as described in FIGS. 1a and 1b.

Namely, to that end, it is necessary that the impact points of the light on scanning bar A are able to be shifted in measuring direction X without at the same time interfering with the measurement. For this, the optical structures on scanning bar A must be periodic or translation-invariant with respect to first direction X. Reflecting surfaces or transparent surfaces which extend in the measuring direction, e.g., first direction X, and grating structures whose lines extend parallel to first direction X are translation-invariant. Suitable periodic optical structures are grating structures whose grating periods do not change in the X-direction.

In the following, two exemplary embodiments of the present invention are described, in which the scanning bar bears such translation-invariant or periodic structures exclusively. Thus, a position-measuring device may be provided which is constructed according to FIGS. 1a and 1b, and at the same time, permits a measurement of scanning distance d.

FIGS. 5a to 7b show a first exemplary embodiment of the present invention. The type of representation is selected analogously to that illustrated in FIGS. 2a to 4b, in that the impact points of the various light beams are numbered consecutively and shown in different views of the boundary surfaces involved. By viewing FIGS. 5a to 7b as a whole, the beam path of the first exemplary embodiment may be fully understood.

A few features of this exemplary embodiment are discussed below.

FIGS. 5a and 5b show the upper side (which the light from the light source strikes first) and the lower side of scanning bar A (i.e., in each case, a section thereof, scanning bar A is extended in first direction X) having its various optical structures O1, O2, O3, O4. These structures are either translation-invariant with respect to the first direction (e.g., the measuring direction) X, like light-transmitting areas O1, reflecting surfaces O2 and the one-dimensional gratings having grating periods O4, variable in the Y-direction, whose line direction is parallel to measuring direction X, or periodic, like evenly-spaced gratings O3 whose line direction lies transversely to measuring direction X. The condition indicated above for a suitable scanning bar A is therefore satisfied.

FIG. 5c shows the upper side (which the light from the light source strikes first) of scale M (i.e., a section thereof, since scale M extends in second direction Y) having its various optical structures O3. These structures O3 are translation-invariant with respect to second direction Y. The condition indicated above for a suitable scale M is therefore satisfied.

Figure 6A:
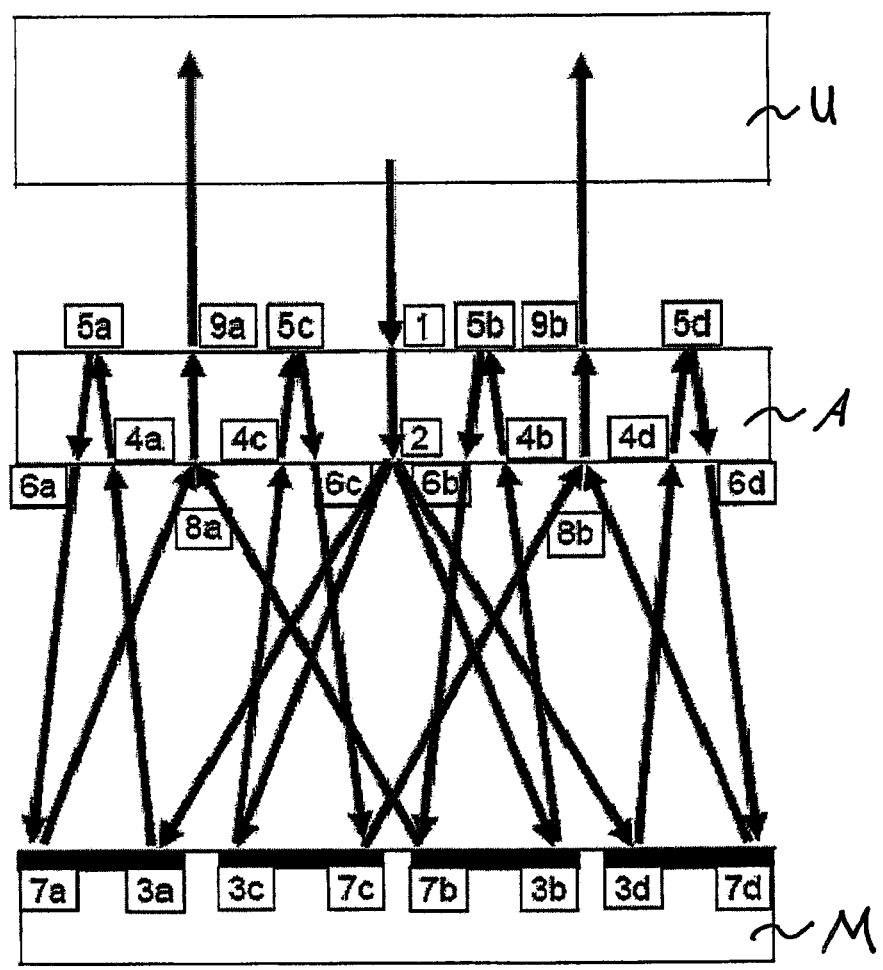
Figure 6B:
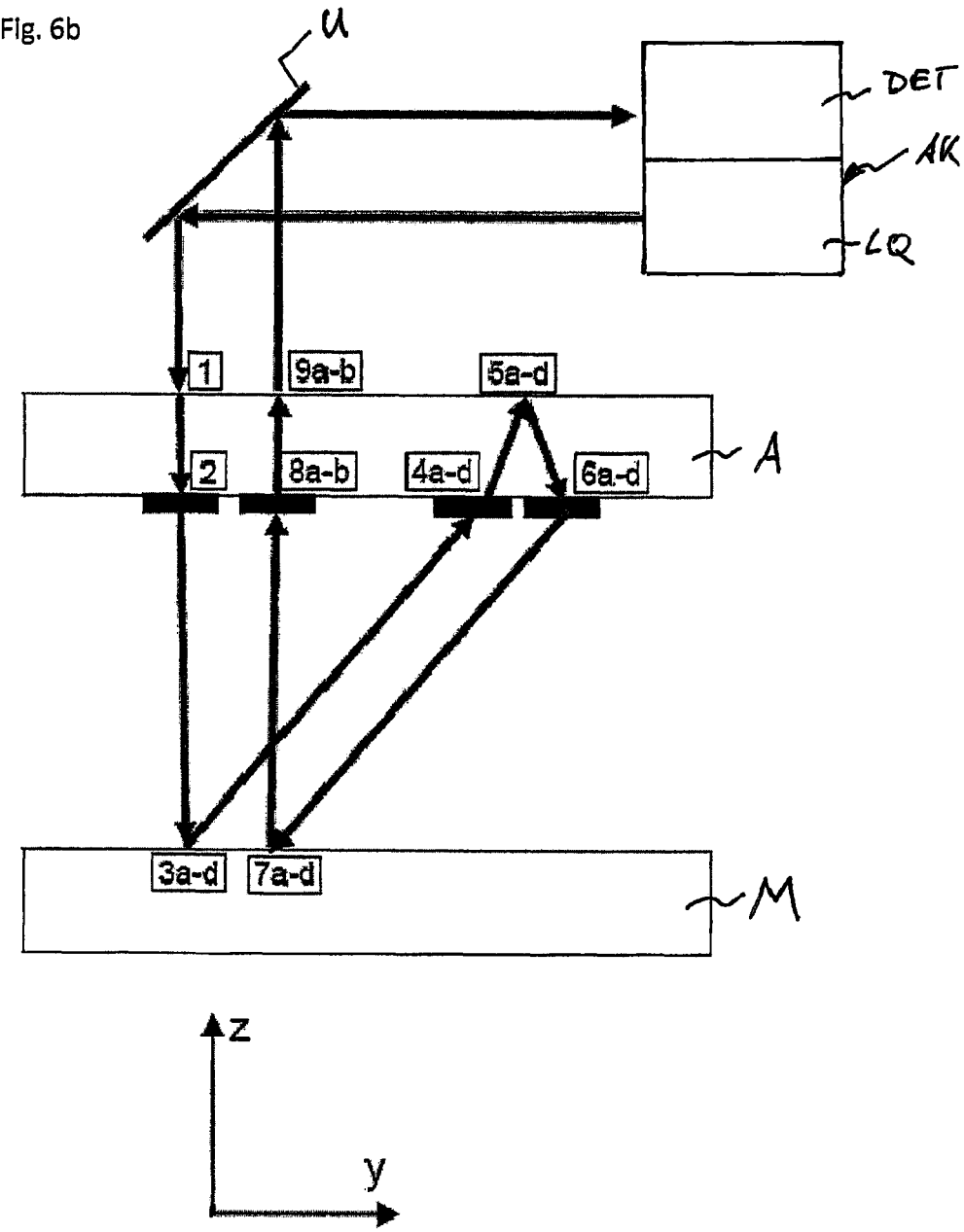

FIGS. 6a and 6b show deflection element U, by which the light from light source LQ is directed from scanning head AK to scanning bar A and back to detectors DET in scanning head AK.

From impact point 2 on the lower side of scanning bar A, four light beams travel to scale M. Partial beams A1, A2 with impact points 3d and 3c form a first bundle of partial beams A.

Partial beams B1, B2 with impact points 3a and 3b form a second bundle of partial beams B.

Illustrated is the asymmetry of partial beams A1, A2 or B1, B2 within a bundle of partial beams A and B, respectively, which leads to light paths of different length between the respective partial beams, and therefore to a phase difference that, in addition, is a function of scanning distance d. The two partial beams A1, A2 and B1, B2, respectively, in each case travel asymmetrically with respect to a plane to which measuring direction X is perpendicular and which includes impact point 2, as illustrated in the unfolded beam path in FIG. 7a.

Also illustrated is the symmetry between the two bundles of partial beams A and B, which is necessary in order to ascertain the shift information in the X-direction by adding the position information from the two bundles of partial beams, and ascertaining the change in scanning distance d by subtraction. If the two partial beams A1, A2 of beam A are mirrored on the specified plane, beam B is obtained.

Again, one finds the combination of diffractive cylindrical lens (optical structure O4 which includes impact points 4a to 4d), mirror (optical structure O2 which includes impact points 5a to 5d) and further diffractive cylindrical lens (optical structure O4 which includes impact points 6a to 6d), with which a retroreflection of all partial beams A1, A2, B1, B2 is brought about to compensate for tilting movements of scanning bar A.

At impact points 8b and 8a, respectively, the partial beams of the two bundles of partial beams A, B are united and brought to interference. At points 9a and 9b, two light beams then leave scanning bar A in the direction of deflection element U, and from these light beams, the necessary periodic signals may be obtained, e.g., in a conventional manner.

One disadvantage of the different path lengths and therefore of the phase difference of the partial beams within a bundle of partial beams is that changes in the light wavelength also lead to periodic signals in the detectors of scanning head AK.

The second exemplary embodiment shows one possibility to at least reduce the wavelength-dependency of the position measurements (X and d), in that the phase difference of the partial beams brought to interference vanishes at the operating point, e.g., at the setpoint scanning distance.

The second exemplary embodiment is illustrated in FIGS. 8a to 10b. The type of representation is selected analogously to the representation of the first exemplary embodiment in FIGS. 5a to 7b, in that the impact points of the various light beams are numbered consecutively and shown in different views of the boundary surfaces involved. The beam path of the second exemplary embodiment may be fully understood by viewing FIGS. 8a to 10b as a whole.

A few features of this exemplary embodiment are described below.

FIGS. 8a and 8b show the upper side (which the light from the light source strikes first) and the lower side of scanning bar A (i.e., in each case, a section thereof, since scanning bar A extends in first direction X) having its various optical structures O1, O2, O3, O4, O5. These structures are either translation-invariant with respect to the first direction (e.g., measuring direction) X, like light-transmitting areas O1, reflecting surfaces O2, and one-dimensional gratings O4 having a grating period variable in the Y-direction, whose line direction is parallel to measuring direction X, or periodic, like evenly-spaced gratings O3, whose line direction lies transversely with respect to measuring direction X, or like two-dimensional grating O5, whose grating period Is constant in measuring direction X, but variable in second direction Y. The condition indicated above for a suitable scanning bar A is therefore satisfied again.

FIG. 8c shows the upper side (which the light from light source LQ strikes first) of scale M (i.e., a section thereof, since scale M extends in second direction Y) having its various optical structures O1, O2, O3. These structures are again translation-invariant with respect to second direction Y.

Figure 9A:
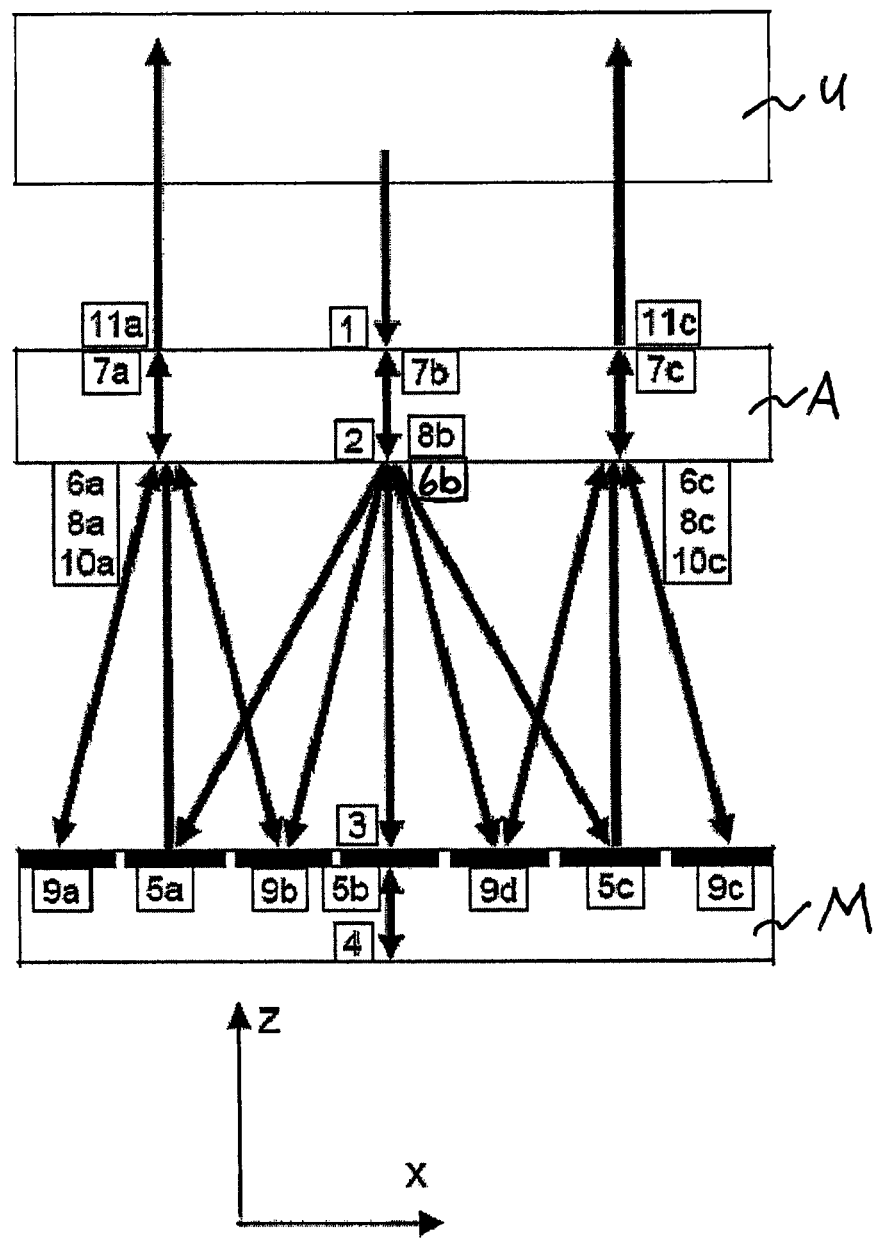
Figure 9B:
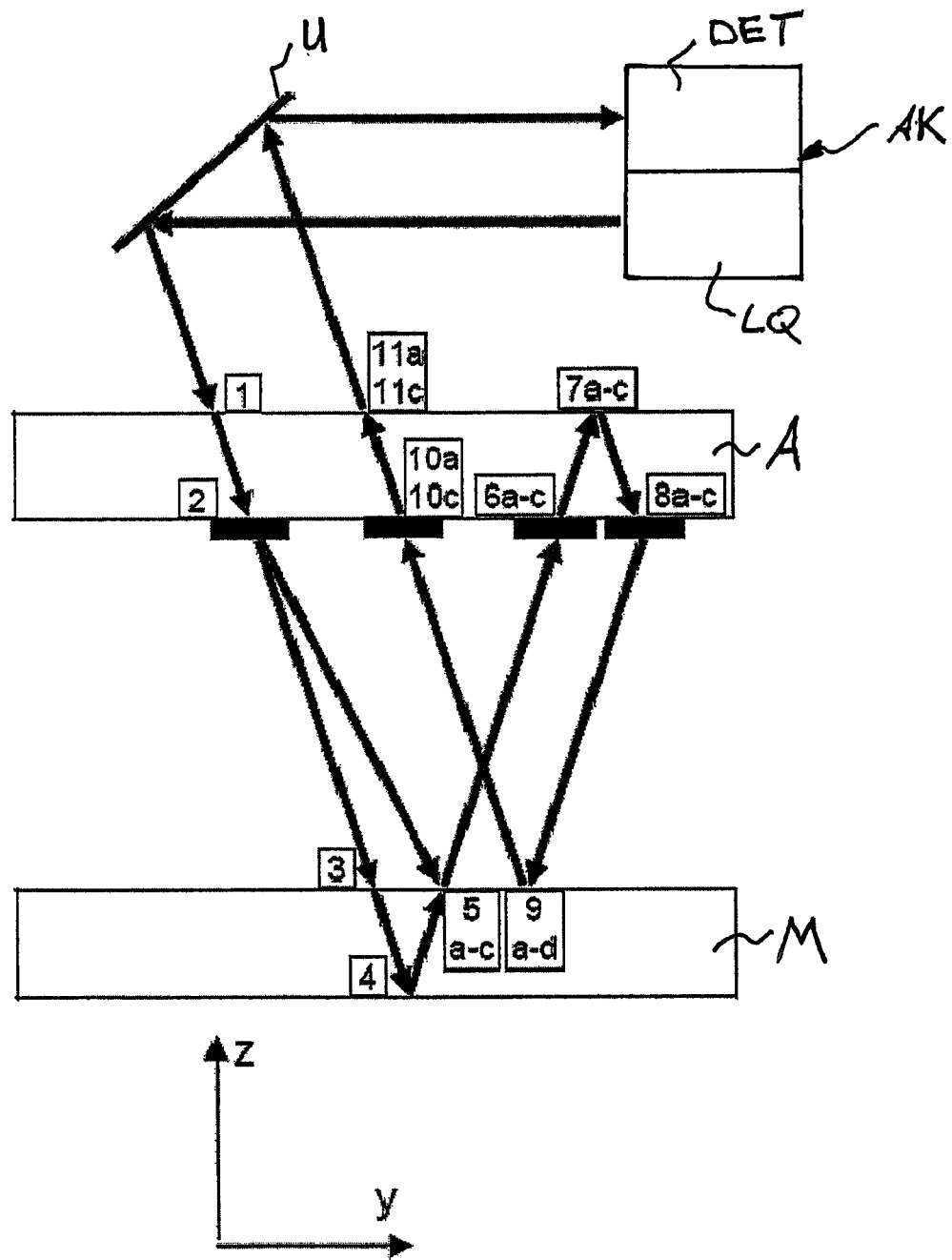

FIGS. 9a and 9b show deflection element U, by which the light from light source LQ is directed from scanning head AK to scanning bar A and from it back to detectors DET in scanning head AK.

Figure 10A:
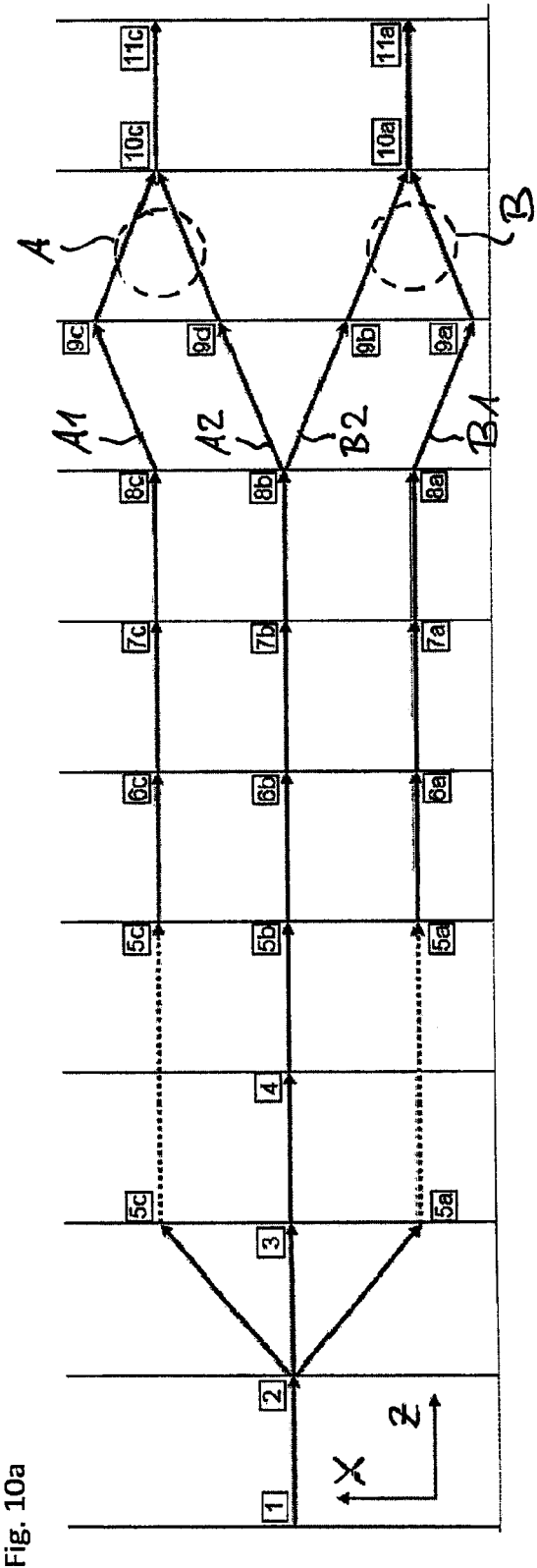
Figure 10B:
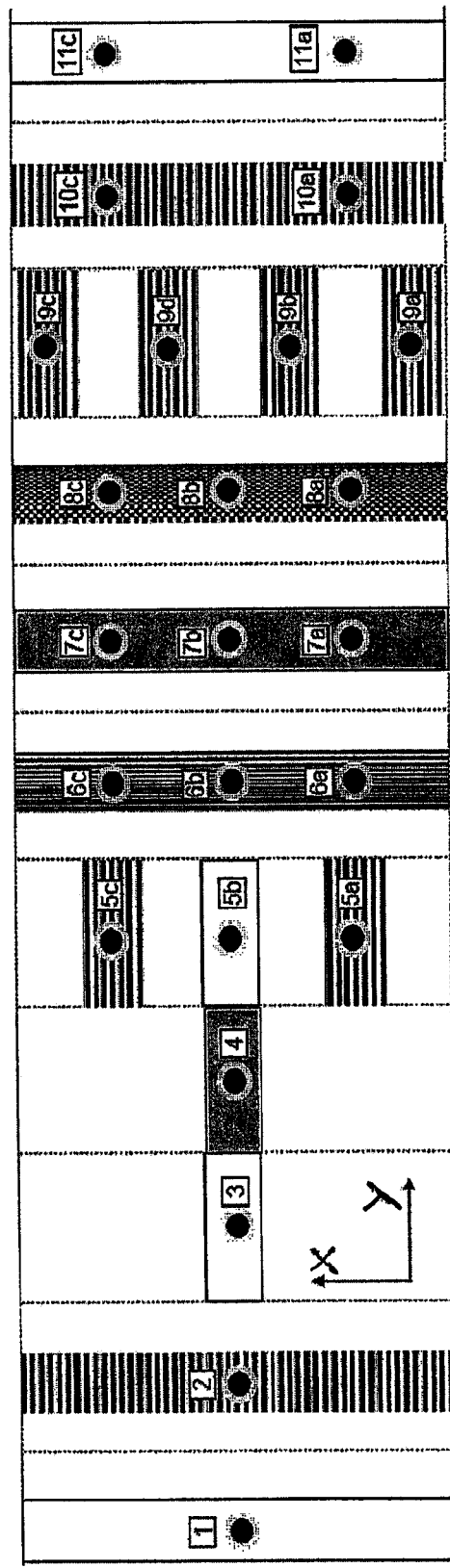

As illustrated, particularly in viewing FIGS. 9b and 10a as a whole, at impact point 2 on the lower side of scanning bar A, initially a split takes place into three partial beams, of which two arrive at impact points 5a and 5c on the upper side of scale M, where they are reflected at a grating back to scanning bar A. The third partial beam, however, falls through a transparent area on the upper side of the scale (impact point 3) onto a mirrored area on the back side of scale M (impact point 4), is reflected there and leaves scale M at its front side at impact point 5b. If one compares the phase position of the partial beams at impact points 5a, 5b and 5c, all partial beams have traveled an equally long distance.

The partial beam from impact point 5b is first split at impact point 8b, and then forms partial beam A2 of bundle of partial beams A and partial beam B2 of bundle of partial beams B. They both again travel distances of equal length.

Since the additional distance through scale M is fixed, the phase difference vanishes only for a specific scanning distance d, the operating point. Changes in the wavelength of the light therefore do not falsify the position measurement at the operating point. If scanning distance d changes, then the phase difference of the partial beams within bundles of partial beams A, B nevertheless changes, and the detectors generate periodic signals. By forming the difference of the position change produced from bundles of partial beams A and B, one again obtains the change in scanning distance d.

In this exemplary embodiment, as well, one can see in FIG. 10a the asymmetry of the partial beams within a bundle of partial beams A, B, as well as the symmetry between the two bundles of partial beams A, B, in each case with respect to a plane perpendicular to measuring direction X.

One also recognizes in this exemplary embodiment, a device that may compensate for tilting motions of scanning bar A. The partial beams pass through a first diffractive cylindrical lens at impact points 6a, 6b, 6c, which focuses the light onto a mirror at impact points 7a, 7b, 7c, from where the light travels to the second diffractive cylindrical lens at impact points 8a, 8b, 8c.

The second cylindrical lens also fulfills a second function. As already mentioned above, the middle partial beam, which has traveled the additional distance through the scale substrate, is first split into partial beams A2 and B2 at impact point 8b.

In order to produce a lens effect common to bundles of partial beams A and B in the Y-direction at impact points 8a, 8b, 8c, accompanied at the same time by different diffraction in the X-direction, optical structure O5 has a first variable periodicity in the Y-direction and a second constant periodicity in the X-direction. Thus, a cross grating or a chessboard pattern is obtained locally, whose period is variable in the Y-direction, but constant in the X-direction. Consequently, this optical structure O5 also satisfies the important condition that it be periodic in the X-direction. Therefore, it may be applied in any length on a scanning bar A.

Since each periodicity or frequency in a grating generates its own orders of diffraction, the intensity in the individual orders of diffraction, and therefore in the partial beams, decreases with the number of periodicities present. In order to obtain good signals in detectors DET, care should be taken that optical structures O1 to O5 used have a maximum of two periodicities or frequencies locally. This boundary condition is satisfied in both exemplary embodiments. Transparent areas O1 and reflecting surfaces O2 include no periodicities at all. One-dimensional gratings O3 include one periodicity (this holds true upon local examination as well, if the grating period is locally variable). Only optical structure O5 of the second exemplary embodiment includes—upon local examination—two periodicities.

For example, the effect of this boundary condition is that not too many functions such as splitting or uniting of partial beams, alignment of partial beams or focusing of partial beams may be put in individual boundary surfaces of scanning bar A or scale M. Rather, the necessary functionalities must be distributed such that the condition—to have a maximum of two periodicities or frequencies locally in optical structures O1 to O5—may be satisfied.

In both exemplary embodiments described, the retroreflection necessary to compensate for tilting motions takes place in scanning bar A. It is also possible to provide this function in scale M. The designations of scanning bar A and scale M are arbitrary, as well. In the final analysis, they are two crossed measuring standards, of which one must be at least partially transparent and the other must be at least partially reflecting.

In the exemplary embodiments described herein, scanning bar A extends in measuring direction X, and therefore bears gratings having lines that are transverse to measuring direction X, and thus transverse to its extension direction. However, scanning bar A may also be arranged transversely to measuring direction X if it bears grating lines parallel to its extension direction, as shown, for example, in FIG. 6 of WO 2008/138501, referred to above. The line direction of the scale grating is then rotated accordingly, as well.

The two measuring standards, scanning bar A and scale M, also do not necessarily have to be linear. So long as both define one plane, it is possible for one of the two directions X, Y to represent a circular arc or other curved path, relative to which, a shift is to be measured. In this manner, for example, a distance on a circular arc and therefore an angle may be measured.

In all exemplary embodiments, according to the figures, after partial beams A1, A2 and B1, B2, respectively, have been united, one light beam per bundle of partial beams A, B leaves the scanning bar in the direction of the detector. There, however, in each case a plurality of phase-shifted signals must be formed per bundle of partial beams in a plurality of detectors. To that end, in addition, orders of diffraction other than the two beams drawn are utilized, or with the aid of additional phase-shifting elements, polarizers and beam splitters in the beam path, corresponding light beams are produced for the detectors. Such measures are conventional and are therefore not discussed in greater detail here.

Prior to the retroreflection by diffractive cylindrical lenses and mirrors necessary for the compensation of tilting motions, it may be provided to align all partial beams involved in parallel, or at least to align them so that the directional components in measuring direction X are equal in terms of actual amount, since the same cylindrical lenses may then be used for all partial beams.

What is claimed is:

1. An optical position-measuring device, comprising:
   a scanning bar extending in one of (a) a first and (b) a second of two directions;
   a scale extending in another one of (a) the first and (b) the second directions, the extending direction of the scale being different from the extending direction of the scanning bar such that the scanning bar and the scale cross at a point of intersection;
   a light source; and
   a detector;
   wherein the scale is offset by a scanning distance with respect to the scanning bar in a third direction perpendicular to the first and second directions;
   wherein the light source is arranged such that light from the light source penetrates the scanning bar at the point of intersection of the scanning bar and the scale in order to fall on the scale, and from there, to arrive back at the scanning bar, and further, at the detector, the light being split by diffraction into different partial beams, and combined again, at optical structures of the scanning bar and the scale;
   wherein the detector is adapted to generate periodic detector signals in response to a shift between the scanning bar and the scale in the first direction, due to interference of the partial beams combined with each other; and
   wherein the detector is adapted to generate periodic detector signals in response to a change in the scanning distance between the scanning bar and the scale.

2. The optical position-measuring device according to claim 1, wherein the detector signals remain unchanged in the event of a shift between the scanning bar and the scale in the second direction.

3. The optical position-measuring device according to claim 1, wherein the partial beams form groups, the partial beams of a first group and the partial beams of a second group having a phase difference between each other as a function of the scanning distance.

4. The optical position-measuring device according to claim 3, wherein the phase difference is reduced to zero for a predefined scanning distance.

5. The optical position-measuring device according to claim 4, wherein one partial beam within each group travels an additional distance within a transparent substrate of one of (a) the scale and (b) the scanning bar.

6. The optical position-measuring device according to claim 3, wherein the partial beams of the first group travel in mirror symmetry relative to the partial beams of the second group with respect to a plane perpendicular to the first direction.

7. The optical position-measuring device according to claim 3, wherein the partial beams of the first group have an asymmetrical course between each other with respect to a plane perpendicular to the first direction, and the partial beams of the second group have an asymmetrical course between each other with respect to a plane perpendicular to the first direction.

8. The optical position-measuring device according to claim 3, wherein the partial beams undergo a retroreflection.

9. The optical position-measuring device according to claim 8, wherein the partial beams travel in parallel prior to and after the retroreflection.

10. The optical position-measuring device according to claim 8, wherein the retroreflection is effected with the aid of at least one diffractive lens and a reflecting surface.

11. The optical position-measuring device according to claim 3, wherein the detector is adapted to generate detector signals, in each case phase-shifted relative to each other, from the interfering partial beams of each group, a shift between the scanning bar and the scale in the first direction and a change in the scanning distance being ascertainable based on different combination of the detector signals of the first group and of the second group.

12. The optical position-measuring device according to claim 1, wherein the optical structures on the scanning bar are at least one of (a) periodic and (b) translation-invariant with respect to the first direction.

13. The optical position-measuring device according to claim 1, wherein the optical structures on the scale are at least one of (a) periodic and (b) translation-invariant with respect to the second direction.

14. The optical position-measuring device according to claim 1, wherein the optical structures on at least one of (a) the scanning bar and (b) the scale have a maximum of two local periodicities.

* * * * *